United States Patent
Bhargava et al.

(10) Patent No.: US 11,496,470 B2
(45) Date of Patent: **\*Nov. 8, 2022**

(54) METHODS FOR RANDOMIZED MULTI-FACTOR AUTHENTICATION WITH BIOMETRICS AND DEVICES THEREOF

(71) Applicant: JPMorgan Chase Bank, N.A., New York, NY (US)

(72) Inventors: Nitin Bhargava, East Brunswick, NJ (US); Troy Braban, Jersey City, NJ (US)

(73) Assignee: JPMORGAN CHASE BANK, N.A., New York, NY (US)

( \* ) Notice: Subject to any disclaimer, the term of this patent is extended or adjusted under 35 U.S.C. 154(b) by 154 days.

This patent is subject to a terminal disclaimer.

(21) Appl. No.: 17/006,013

(22) Filed: Aug. 28, 2020

(65) Prior Publication Data

US 2020/0396219 A1 Dec. 17, 2020

Related U.S. Application Data

(63) Continuation of application No. 15/821,257, filed on Nov. 22, 2017, now Pat. No. 10,778,673.

(51) Int. Cl.
*H04L 9/40* (2022.01)
*G10L 17/22* (2013.01)
(Continued)

(52) U.S. Cl.
CPC ...... *H04L 63/0861* (2013.01); *G06V 40/1365* (2022.01); *G06V 40/70* (2022.01);
(Continued)

(58) Field of Classification Search
CPC .............. H04L 63/0861; H04L 63/083; H04L 2463/082; G06V 40/1365; G06V 40/70; G10L 17/22; G06F 21/32
See application file for complete search history.

(56) References Cited

U.S. PATENT DOCUMENTS

| 7,373,515 B2 | 5/2008 | Owen |
| 8,508,338 B1 | 8/2013 | Fiddy |
(Continued)

FOREIGN PATENT DOCUMENTS

| WO | 2017123098 | 7/2017 |
| WO | 2018200129 | 11/2018 |

OTHER PUBLICATIONS

"How can a totally logical machine like a computer generate a random number?" Aug. 8, 2001 (Year: 2001).

*Primary Examiner* — Carl G Colin
*Assistant Examiner* — Han Yang
(74) *Attorney, Agent, or Firm* — Greenblum & Bernstein, P.L.C.

(57) ABSTRACT

A method, device and non-transitory computer readable medium for randomized multi-factor authentication with biometrics includes randomly selecting one of a plurality of biometrics in response to a request from a client device. At least the randomly selected biometric is requested from the requesting client device. A match of the requested randomly selected biometric received from the requesting client device against stored biometric information above a set threshold is verified. Access for the request is granted when the verification indicates the match.

20 Claims, 3 Drawing Sheets

(51) Int. Cl.
*G06V 40/70* (2022.01)
*G06V 40/12* (2022.01)
(52) U.S. Cl.
CPC ............ *G10L 17/22* (2013.01); *H04L 63/083*
(2013.01); *H04L 2463/082* (2013.01)

(56) References Cited

U.S. PATENT DOCUMENTS

| | | | |
|---|---|---|---|
| 10,305,895 B2 | 5/2019 | Barry | |
| 11,095,639 B2* | 8/2021 | Pham | .................. H04L 63/0861 |
| 2004/0148526 A1* | 7/2004 | Sands | ..................... H04L 63/08 |
| | | | 726/5 |
| 2013/0127591 A1 | 5/2013 | Shay | |
| 2017/0063852 A1 | 3/2017 | Azar | |
| 2018/0309792 A1* | 10/2018 | Obaidi | ..................... G06F 21/32 |
| 2019/0028470 A1* | 1/2019 | Marthinussen | ....... H04W 12/06 |
| 2021/0110015 A1* | 4/2021 | McCarty | ................. G06F 21/32 |
| 2021/0117524 A1* | 4/2021 | McKell-Redwood | ....................... H04L 9/3231 |
| 2021/0176242 A1* | 6/2021 | McDougall | ......... H04L 63/0861 |

* cited by examiner

METHODS FOR RANDOMIZED MULTI-FACTOR AUTHENTICATION WITH BIOMETRICS AND DEVICES THEREOF

CROSS-REFERENCE TO RELATED APPLICATION

This application is a Continuation of U.S. patent application Ser. No. 15/821,257, filed on Nov. 22, 2017. The disclosure of the above noted document, including the specification, drawings, and claims, is incorporated herein by reference in its entirety.

FIELD

This technology generally relates to methods and devices for multi-factor authentication and, more particularly to methods and devices for randomized multi-factor authentication with biometrics.

BACKGROUND

Two-factor authentication or verification is a security process where a user is required to provide two authentication factors for authentication or verification. Typically, the first factor is a password provided by the user and the second factor is a random code provided to the user through another communication channel, such as via email or text.

Unfortunately, users often use the same password for their email as their secure accounts so that when one is comprised the same password works for the other account. Accordingly, in this scenario an attacker can request the code on the registered email and therefore successfully bypass the two-factor authentication. Additionally, even when not comprised, users often do not like the fact that they need to fetch a code the second factor from SMS or email for to be able to login.

Additionally, single factor authentication or a first factor of multifactor authentication requires a user to enter a username and password to verify identity. In this scenario, during initial registration a user may be assigned or generate a unique username and password for authentication which the user must remember.

SUMMARY

A method for randomized multi-factor authentication with biometrics implemented by a computing device includes randomly selecting one of a plurality of biometrics in response to a request from a client device. At least the randomly selected biometric is requested from the requesting client device. A match of the requested randomly selected biometric received from the requesting client device against stored biometric information above a set threshold is verified. Access for the request is granted when the verification indicates the match.

A secure computing device comprising memory comprising programmed instructions stored thereon and one or more processors configured to be capable of executing the stored programmed instructions to randomly select one of a plurality of biometrics in response to a request from a client device. At least the randomly selected biometric is requested from the requesting client device. A match of the requested randomly selected biometric received from the requesting client device against stored biometric information above a set threshold is verified. Access for the request is granted when the verification indicates the match.

A non-transitory machine readable medium having stored thereon instructions for randomized multi-factor authentication with biometrics comprising executable code which when executed by one or more processors, causes the one or more processors to randomly select one of a plurality of biometrics in response to a request from a client device. At least the randomly selected biometric is requested from the requesting client device. A match of the requested randomly selected biometric received from the requesting client device against stored biometric information above a set threshold is verified. Access for the request is granted when the verification indicates the match.

This technology provides a number of advantages including providing methods, non-transitory computer readable media, and devices for randomized multi-factor authentication with biometrics. With this technology, the authentication process is easier and more secure by providing a randomized biometrics authentication option as part of the multi-factor authentication. Additionally, this technology eliminates the risk of an attacker getting access to an email address used with prior multi-factor authentication. Further, the randomness of which biometric option is utilized adds a further level of enhanced security which was not previously available.

DETAILED DESCRIPTION

Figure 1:
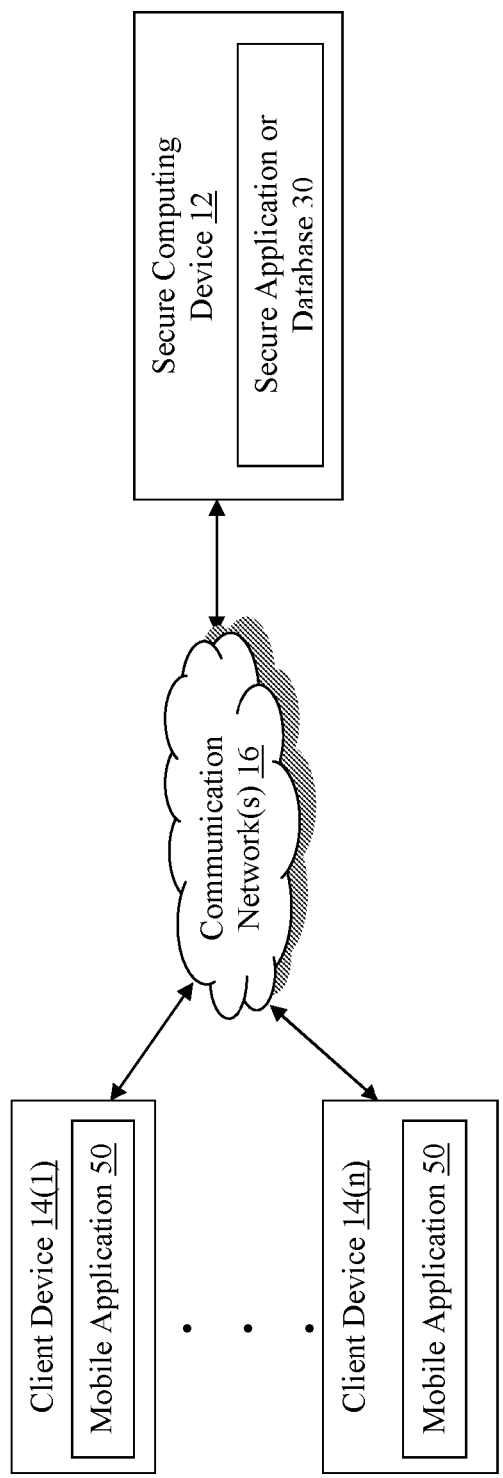
FIG. 1 is a block diagram of an example of an environment with a secure computing device that utilizes a randomized multi-factor authentication with biometrics and a plurality of client computing devices.

Referring to FIG. 1, an exemplary network environment 10 with an exemplary secure computing device 12 is illustrated. The secure computing device 12 in this example is coupled to a plurality of client devices 14(1)-14(n) via communication network(s) 16, although the secure computing device 12 and/or client devices 14(1)-14(n) may be coupled together via other topologies. Additionally, the network environment may include other network devices such as one or more routers and/or switches, for example, which are well known in the art and thus will not be described herein. This technology provides a number of advantages including methods, non-transitory computer readable media, and secure computing devices that more effectively and easily provide randomized multi-factor authentication with biometrics.

Figure 2:
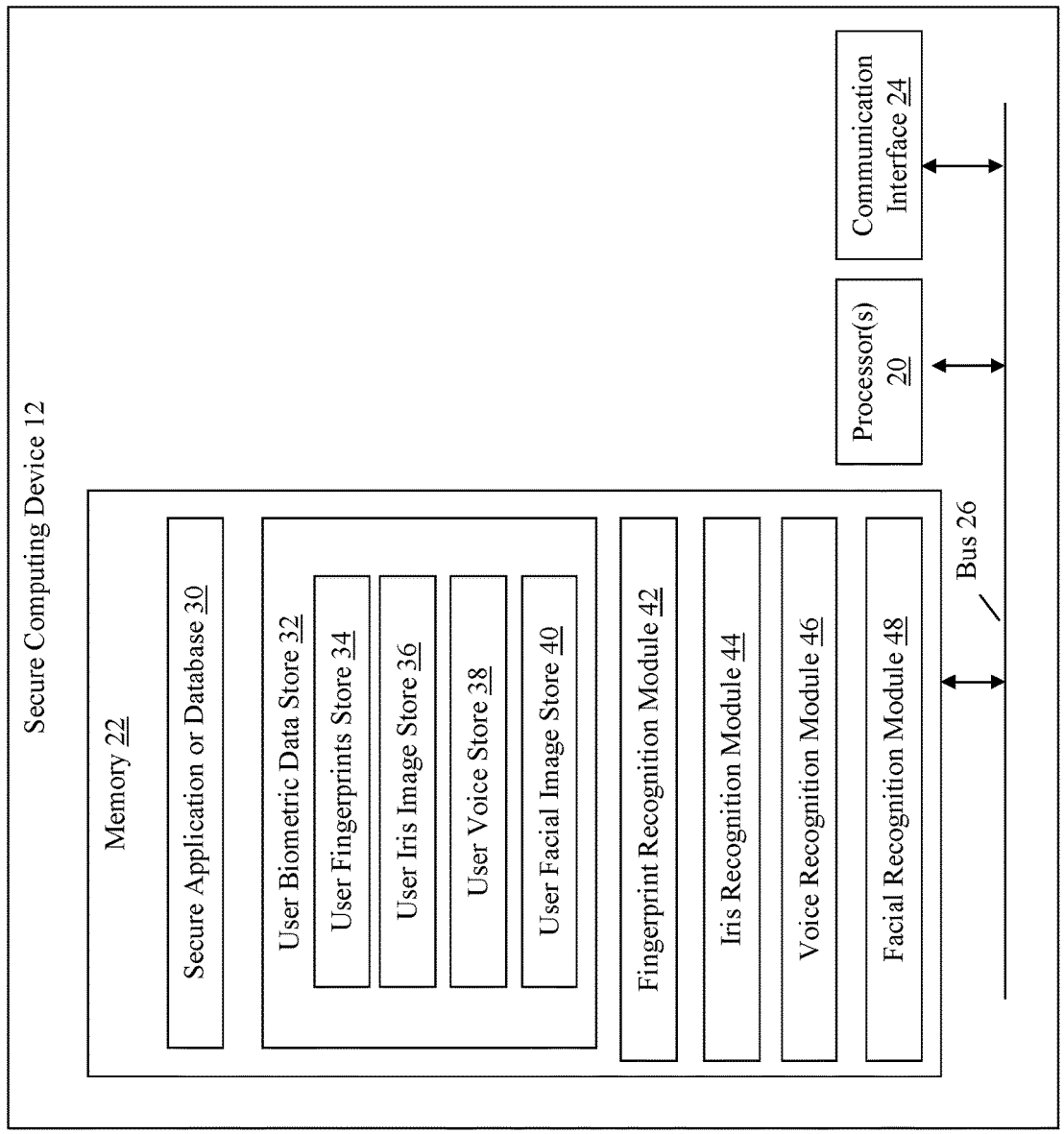
FIG. 2 is a block diagram of an example of the secure computing device that utilizes a randomized multi-factor authentication with biometrics.

Referring to FIGS. 1-2, the secure computing device 12 in this example may be one of one or more secure servers for a variety of different types of entities, such as a financial institution by way of example only. The secure computing device 12 includes one or more processor(s) 20, a memory 22, and/or a communication interface 24, which are coupled together by a bus 26 or other communication link, although the secure computing device 12 can include other types and/or numbers of elements in other configurations. The processor(s) 20 of the secure computing device 12 may execute programmed instructions stored in the memory 22 for the any number of the functions described and illustrated herein. The processor(s) 20 of the secure computing device 12 may include one or more CPUs or general purpose processors with one or more processing cores, for example, although other types of processor(s) 20 can also be used.

The memory 22 of the secure computing device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
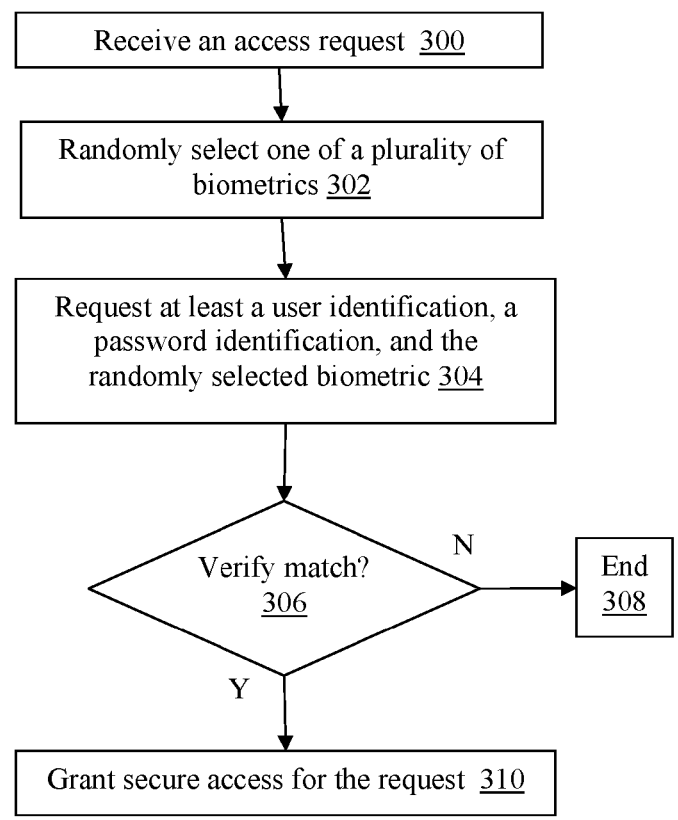
FIG. 3 is a flow chart of an example of a method for randomized multi-factor authentication with biometrics.

Accordingly, the memory 22 of the secure computing device 12 can store one or more applications that can include executable instructions that, when executed by the secure computing device 12, cause the secure computing device 12 to perform actions, such as a randomized multi-factor authentication with biometrics, for example, and to perform other actions described and illustrated below with reference to FIGS. 1-3. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Additionally, the application(s), and even the secure computing device 12 itself, may be located in virtual server(s) running in a cloud-based computing environment rather than being tied to one or more specific physical network computing devices. The application(s) also may be running in one or more virtual machines (VMs) executing on the secure computing device 12. Additionally, in one or more embodiments of this technology, virtual machine(s) running on the secure computing device 12 may be managed or supervised by a hypervisor.

In this particular example, the memory 22 of the secure computing device 12 includes a secure application or database 30 and a user biometrics data store 32 with a user fingerprints store 34, a user iris image store 36, a user voice store 38, a user facial image store 40, a fingerprint recognition module 42, an iris recognition module 44, a voice recognition module 46, and a facial recognition module 48, although the memory 22 can include other applications, data stores, policies, modules, or other databases by way of example only. The secure application or database 30 may be any type of application or other database that requires secure authentication to access, such as a financial or banking application by way of example only.

The user biometric data store 32 may comprise a user fingerprints store 34, a user iris image store 36, a user voice store 38, and a user facial image store 40 which are each configured to store fingerprints, iris images, voice samples, and facial images for registered customers of an entity for use in fingerprint, iris, voice, and/or facial recognition, although other types and/or amounts of biometric data of customers may be stored. During an initial registration process by the secure computing device 12 a user at one of the client devices 14(1)-14(n) may be requested to provide images of all ten fingers, one or more images of one or both iris, one or more audio recordings of one or more phrases requested by the secure computing device 12, and/or one or more facial images of the user along with a user identification and a password identification. During the registration process, the secure computing device 12 may obtain other information from the user at one of the client devices 14(1)-14(n), such as a full name, address, contact information, and other data by way of example only that may be securely stored for use at a later time when the user at one of the client devices 14(1)-14(n) makes a request to the secure computing device 12.

The fingerprint recognition module 42 in this example is configured to compare one or more captured images of fingerprints of a customer at one of the client devices 14(1)-14(n) against stored fingerprint images in the user fingerprints image store 34 for correspondence at or above a set threshold, such as 100% by way of example only, although other thresholds could be used.

The iris recognition module 44 in this example is configured to compare one or more captured images of an iris of a customer at one of the client devices 14(1)-14(n) against stored iris images in the user iris image store 36 for correspondence at or above a set threshold, such as 100% by way of example only, although other thresholds could be used.

The voice recognition module 46 in this example is configured to compare captured voice audio of a phrase spoken by a customer at one of the client devices 14(1)-14(n) against stored voice audio of the spoken phrase in the user voice store 38 for correspondence at or above a set threshold, such as 100% by way of example only, although other thresholds could be used.

The facial recognition module 48 in this example is configured to compare one or more captured images of a face of a customer at one of the client devices 14(1)-14(n) against stored facial images in the user facial image store 40 for correspondence at or above a set threshold, such as 100% by way of example only, although other thresholds could be used.

The communication interface 24 of the secure computing device 12 operatively couples and communicates between the secure computing device 12 and/or the client devices 14(1)-14(n), which are all coupled together by the communication network(s) 16, although other types and/or numbers of communication networks or systems with other types and/or numbers of connections and/or configurations to other devices and/or elements can also be used.

By way of example only, the communication network(s) 16 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 16 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The secure computing device 12 can be a standalone device or integrated with one or more other devices or apparatuses for example. In one particular example, the secure computing device 12 can include or be hosted by one or more other server devices, and other arrangements are also possible. Moreover, the secure computing device 12 can be in a same or a different communication network including one or more public, private, or cloud networks, for example.

The client devices 14(1)-14(n) in this example include any type of computing device that can facilitate interaction with a secure computing device 12, such as smart phone, mobile computing device, desktop computing device, laptop computing device, or tablet computing device by way of example only. Each of the client devices 14(1)-14(n) in this example includes a processor, a memory, and a communication interface, which are coupled together by a bus or other communication link, although other numbers and/or types of network devices could be used.

The client devices may run applications, such as standard web browsers or a standalone mobile client application 50 associated with the secure computing device 12, such as a financial or banking application by way of example only, which may provide an interface for establishing secure communications with the secure computing device 12 via the communication network(s) 16. The client devices 14(1)-14(n) may further include a display device, such as a display screen or touchscreen, and/or an input device, such as a keyboard, for example.

Although the exemplary network environment with the secure computing device 12, client devices 14(1)-14(n), and communication network(s) 16 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the secure computing device 12 by way of example only, may be configured to operate as virtual instances on the same physical machine. Additionally, there may be more or fewer secure computing devices or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of randomized multi-factor authentication with biometrics will now be described with reference to FIGS. 1-3. Referring more specifically to FIG. 3, in step 300 in this example, the secure computing device 12 may receive a request to access a secure application or database 30, such as an application for a financial instrument, from one of the client devices 14(1)-14(n) via a standard web browser or a standalone mobile client application 50, such as an application associated with a financial institution by way of example only.

In step 302, in response to the received request from one of the client devices 14(1)-14(n), the secure computing device 12 randomly selects one of a plurality of biometrics, such as fingerprint recognition, iris recognition, voice recognition, or facial recognition by way of example only, although other types of biometrics could be used. Additionally, when fingerprint recognition is selected, the secure computing device 12 may randomly selected one or more of the ten available fingers for the biometric to add another level of randomization and security. Further when voice recognition is selected, the secure computing device 12 may randomly select one or more of a plurality of stored phrases which are provided to the requesting one of the client computing devices 14(1)-14(n) to capture recorded audio to again add another level of randomization and security.

In step 304, the secure computing device 12 requests at least a user identification, a password identification, and the randomly selected biometric from the requesting one of the client devices 14(1)-14(n), although other types and/or amounts of additional verification information could be requested. In another example, in this step the secure computing device 12 may request the randomly selected one of the plurality of biometrics in response to a request from the requesting one of the client devices 14(1)-14(n) with the need for a username and password.

In step 306, the secure computing device 12 verifies whether there is a match of the requested user identification, the requested password identification and the requested randomly selected biometric received from the requesting one of the client devices 14(1)-14(n) against stored user identification, stored password identification, and stored biometric information above a set threshold, such as a one hundred percent threshold, although other thresholds may be used. The secure computing device 12 may execute one or more of the fingerprint recognition module 42, the iris recognition module 44, the voice recognition module 46, or the facial recognition module 48 which utilize the user biometric data store 32 with the user fingerprint store 34, the user iris image store, the user voice store 38, and the user facial image store 40 to verify the randomly selected biometric. In the alternative example discussed in step 304 when only the randomly selected biometric is requested, then in step 306 the verification of the match will only require a match of the randomly selected biometric above a set threshold for access to be granted.

In step 306 when the secure computing device 12 does not verify a match, then the No branch is taken to step 308 where this example of the method may end. In another example, when the No branch is taken the requesting one of the client devices 14(1)-14(n) may be provided one or more opportunities by the secure computing device 12 to reenter the requested user identification, the requested password identification and the requested randomly selected biometric before ending this example of the method.

In step 306 when the secure computing device 12 does verify a match, then the Yes branch is taken to step 310. In step 310, the secure computing device 12. By way of example, when access is granted, the secure computing device 12 may populate an associated form for the received requested from the requesting one of the client devices 14(1)-14(n) based on stored user information.

Accordingly, as illustrated and described by way of the examples herein this technology provides methods, non-transitory computer readable media, and devices for randomized multi-factor authentication with biometrics. With this technology, the authentication process is easier and more secure by providing a randomized biometrics authentication option as part of the multi-factor authentication. Additionally, this technology eliminates the risk of an attacker getting access to an email address used with prior multi-factor authentication. Further, the randomness of which biometric option is utilized adds a further level of enhanced security which was not previously available.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

The invention claimed is:

1. A method for randomized multi-factor authentication with biometrics implemented by a computing device, the method comprising:
   registering, by a secure computing device, biometric information of a user, the biometric information including various biometric values corresponding to a plurality of biometric types;
   randomly selecting any biometric type of biometric information to collect, among the plurality of biometric types, for performing authentication in response to a request from a client device;
   in response to selection of the biometric type, randomly selecting a biometric value among a plurality of biometric values corresponding to the randomly selected biometric type;
   requesting the randomly selected biometric value corresponding to the randomly selected biometric type from the requesting client device;
   verifying a match of the requested randomly selected biometric value corresponding to the randomly selected biometric type received from the requesting client device against stored information at or above a set threshold; and
   granting access for the request when the match is verified.

2. The method as set forth in claim 1, wherein the randomly selecting the biometric value includes:
   when a finger image biometric type is selected, randomly selecting an image of one of fingers of the user for verification.

3. The method as set forth in claim 1, wherein the randomly selecting the biometric value includes:
   when an iris biometric type is selected, randomly selecting one image of an iris among irises of the user for verification.

4. The method as set forth in claim 1, wherein the randomly selecting the biometric value includes:
   when an audio recording type is selected, randomly selecting an audio recording of a phrase among audio recordings of the user for verification.

5. The method as set forth in claim 1, wherein the randomly selecting the biometric value includes:
   when a facial image type is selected, randomly selecting a facial image among facial images of the user for verification.

6. The method as set forth in claim 1, wherein the stored information includes a user identification, a password, and the biometric information of the user.

7. The method as set forth in claim 6, wherein the granting of the access further requires a match against the stored information for the randomly selected biometric value, the user identification and the password.

8. The method as set forth in claim 6, wherein the access is denied when no match against the stored information is provided for at least one of: the randomly selected biometric value, the user identification and the password.

9. The method as set forth in claim 1, wherein the randomly selecting one of the plurality of biometric types further comprises randomly selecting from at least one of fingerprint recognition, iris recognition, voice recognition, or facial recognition as the biometric type requested from the client device.

10. The method as set forth in claim 1, further comprising populating a form based on stored data associated with the verified client device in response to the granted access.

11. The method as set forth in claim 1, wherein the set threshold is one hundred percent.

12. The method as set forth in claim 1, wherein only a single biometric value is requested from the client device for verifying the match.

13. The method as set forth in claim 1, wherein a combination of biometric values is requested from the client device for verifying the match.

14. The method as set forth in claim 1, wherein the biometric information includes images of all ten fingers of the user.

15. The method as set forth in claim 1, wherein the biometric information includes images of irises of the user.

16. The method as set forth in claim 1, wherein the biometric information includes audio recordings of phrases requested by the secure computing device.

17. The method as set forth in claim 1, wherein the biometric information includes facial images of the user.

18. The method as set forth in claim 1, further comprising registering, by the secure computing device, a user identification and a password of the user.

19. A secure computing device comprising:
   a memory that stores programmed instructions, and
   one or more processors configured to be capable of executing the stored programmed instructions to:
   register biometric information of a user, the biometric information including various biometric values corresponding to a plurality of biometric types;
   randomly select any biometric type of biometric information to collect, among the plurality of biometric types for performing authentication in response to a request from a client device;
   in response to selection of the biometric type, randomly select a biometric value among a plurality of biometric values corresponding to the randomly selected biometric type;
   request the randomly selected biometric value corresponding to the randomly selected biometric type from the requesting client device;
   verify a match of the requested randomly selected biometric value corresponding to the randomly selected biometric type received from the requesting client device against stored information at or above a set threshold; and
   grant access for the request when the match is verified.

20. A non-transitory machine readable medium having stored thereon instructions for randomized multi-factor authentication with biometrics comprising executable code which when executed by one or more processors, causes the one or more processors to:

register, by a secure computing device, biometric information of a user, the biometric information including various biometric values corresponding to a plurality of biometric types;

randomly select any biometric type of biometric information to collect, among the plurality of biometric types for performing authentication in response to a request from a client device;

in response to selection of the biometric type, randomly select a biometric value among a plurality of biometric values corresponding to the randomly selected biometric type;

request the randomly selected biometric value corresponding to the randomly selected biometric type from the requesting client device;

verify a match of the requested randomly selected biometric value corresponding to the randomly selected biometric type received from the requesting client device against stored information at or above a set threshold; and grant access for the request when the match is verified.

* * * * *